US008867535B2

(12) United States Patent
Takada et al.

(10) Patent No.: US 8,867,535 B2
(45) Date of Patent: Oct. 21, 2014

(54) RELAY APPARATUS, COMMUNICATION SYSTEM AND COMMUNICATION METHOD

(75) Inventors: Hiroaki Takada, Nagoya (JP); Ryo Kurachi, Nagoya (JP); Yukihiro Miyashita, Yokkaichi (JP)

(73) Assignees: National University Corporation Nagoya University, Aichi (JP); Autonetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 319 days.

(21) Appl. No.: 12/996,107

(22) PCT Filed: Jul. 10, 2009

(86) PCT No.: PCT/JP2009/003249
§ 371 (c)(1),
(2), (4) Date: Dec. 3, 2010

(87) PCT Pub. No.: WO2010/004765
PCT Pub. Date: Jan. 14, 2010

(65) Prior Publication Data
US 2011/0085547 A1    Apr. 14, 2011

(30) Foreign Application Priority Data
Jul. 10, 2008    (JP) ................................ 2008-180686

(51) Int. Cl.
*H04L 12/28*    (2006.01)
*H04L 12/46*    (2006.01)
*H04L 12/40*    (2006.01)

(52) U.S. Cl.
CPC ... *H04L 12/4625* (2013.01); *H04L 2012/40273* (2013.01)

USPC ............................ 370/389; 709/201; 370/401

(58) Field of Classification Search
USPC .......................................................... 370/389
See application file for complete search history.

(56) References Cited

U.S. PATENT DOCUMENTS

| | | | |
|---|---|---|---|
| 6,101,184 A * | 8/2000 | Tobe et al. | 370/390 |
| 6,321,150 B1 * | 11/2001 | Nitta | 701/32.7 |
| 7,216,031 B2 * | 5/2007 | Nomura | 701/114 |
| 2006/0195233 A1 * | 8/2006 | Ogawa et al. | 701/2 |

(Continued)

FOREIGN PATENT DOCUMENTS

| | | |
|---|---|---|
| DE | 11 2008 002 092 T5 | 7/2010 |
| DE | 11 2008 002 180 T5 | 9/2010 |

(Continued)

OTHER PUBLICATIONS

International Search Report issued in Application No. PCT/JP2009/003249; Dated Oct. 20, 2009.

*Primary Examiner* — Jonathan C Teixeira Moffat
*Assistant Examiner* — Eyob Hagos
(74) *Attorney, Agent, or Firm* — Oliff PLC

(57) ABSTRACT

Relay apparatuses read the attribute values of data, i.e., numerical information representing measurement values, calculation values, control values, etc., from receive buffers in which data received from ECUs connected thereto is stored, and create trunk frames containing the numerical information and transmit and receive trunk frames via trunk lines. The relay apparatuses derive numerical information from trunk frames received from the other relay apparatuses and renew the numerical information on the data stored in their respective databases using the derived numerical information.

7 Claims, 10 Drawing Sheets

(56) References Cited

U.S. PATENT DOCUMENTS

| | | | |
|---|---|---|---|
| 2006/0259231 A1* | 11/2006 | Ichikawa et al. | 701/115 |
| 2007/0300024 A1* | 12/2007 | Yokogawa | 711/161 |
| 2010/0124232 A1 | 5/2010 | Takada et al. | |
| 2010/0138472 A1 | 6/2010 | Takashima | |

FOREIGN PATENT DOCUMENTS

| | | | | |
|---|---|---|---|---|
| JP | A-2005-020310 | | 1/2005 | |
| JP | 2007251828 A | * | 9/2007 | H04L 12/28 |
| JP | A-2007-251828 | | 9/2007 | |
| JP | A-2007-300331 | | 11/2007 | |

* cited by examiner

FIG. 5

| MESSAGE ID (CAN ID) | NUMBER OF ATTRIBUTE VALUES | 1 | | | 2 | | | ... |
|---|---|---|---|---|---|---|---|---|
| | | ATTRIBUTE VALUE ID | POSITION (ORDER) | LENGTH (bit) | ATTRIBUTE VALUE ID | POSITION (ORDER) | LENGTH (bit) | |
| 1 | 2 | 1 | 1 | 1 | 2 | 2 | 1 | ... |
| 2 | 4 | 20 | 2 | 1 | 50 | 4 | 8 | ... |
| 3 | n | 8 | 4 | 3 | 5 | n | 4 | ... |
| 4 | 64 | 1 | 1 | 1 | 2 | 2 | 1 | ... |
| ... | ... | ... | ... | ... | ... | ... | ... | |

{ NUMBER OF ATTRIBUTE VALUES }

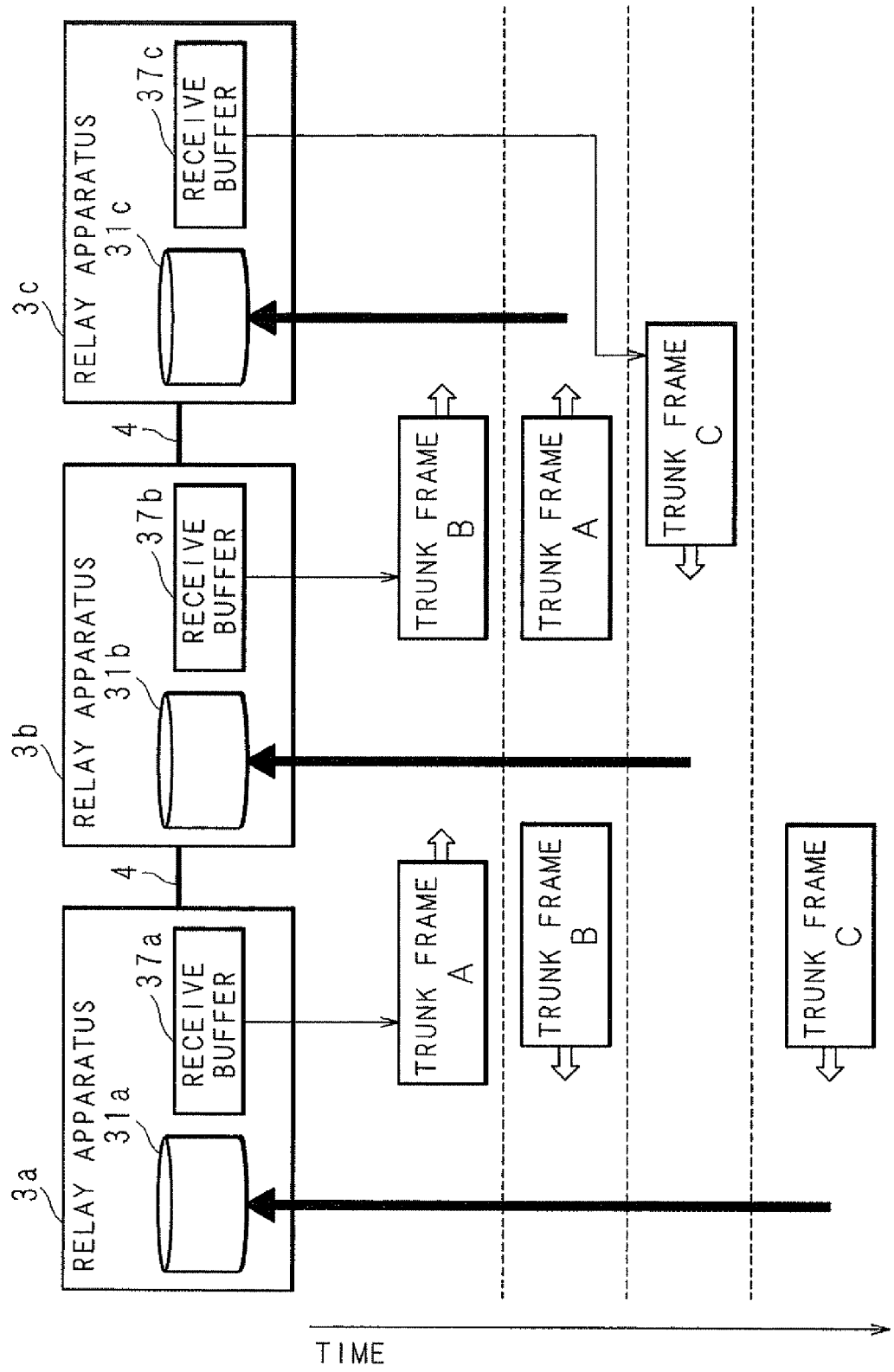

RELAY APPARATUS, COMMUNICATION SYSTEM AND COMMUNICATION METHOD

This application is the national phase under 35 U.S.C. §371 of PCT International Application No. PCT/JP2009/003249 which has an International filing date of Jul. 10, 2009 and designated the United States of America.

BACKGROUND

1. Technical Field

The present invention relates to a communication system in which data is transmitted and received among a plurality of communication apparatuses. More particularly, the present invention relates to relay apparatuses, a communication system including the relay apparatuses and a communication method, capable of shortening the time required for data exchange by reducing the amount of communication so as to reduce communication load in the case that data is exchanged among the relay apparatuses in a communication system provided with the plurality of relay apparatuses for relaying the transmission and reception of data.

2. Description of Related Art

In recent years, there has been used, in various fields, a system in which a plurality of communication apparatuses are connected, functions are assigned to the respective communication apparatuses so that data is exchanged mutually among the communication apparatuses and various processes are carried out in cooperation. For example, in the field of vehicle-mounted LAN (local area network) on vehicles, ECUs (Electronic Control Units) are used as communication apparatuses to carry out processes specific to the respective ECUs and to exchange data among them, whereby various functions are achieved in the system.

As the functions of the respective communication apparatuses are specialized and the functions that can be carried out by the respective communication apparatuses increase in number, the communication apparatuses to be connected to communication media also increase in number and type. Furthermore, since various functions are expected to be carried out in the system, it becomes necessary for the respective communication apparatuses to share data and operate in cooperation, whereby the amount of data to be transmitted increases.

The increase in the amount of data to be transmitted and received via a communication line may cause data delay or dropout due to collision. Significant data delay or dropout may be sometimes fatal to the driving assistance functions of a vehicle, such as brake control using an ECU.

Accordingly, there has been generally used a configuration which includes a plurality of communication lines and in which ECUs are connected to the respective communication lines. This configuration is adopted because wasteful use of communication lines can be suppressed by grouping ECUs in which data is shared. Furthermore, another configuration has also been used in which, for the purpose of using communication lines efficiently to cope with the increase in the type of ECUs, the ECUs are classified depending on the type of data to be transmitted and received and connected to communication lines, communication speeds of which are different. With these configurations, relay apparatuses for controlling data transmission and reception are connected among different communication lines.

Even in the case that the communication apparatuses are divided into a plurality of groups, the amount of data to be transmitted to the communication lines is not reduced in a configuration in which the relay apparatuses transfer all the data required for the control of the respective communication apparatuses. Hence, Japanese Patent Application Laid-Open No. 2007-300331 discloses a technology in which data received from each communication apparatus is stored once in a database, data required for each communication apparatus is read from the database and transmitted as necessary, and data recorded in the databases is transmitted and received among the apparatuses having databases, whereby the databases are shared.

SUMMARY

With the technology disclosed in Japanese Patent Application Laid-Open No. 2007-300331, a configuration is obtained in which the communication apparatuses are divided into a plurality of groups, apparatuses having databases are used to relay the transmission and reception of data among different groups, and the databases are shared, whereby data delay can be reduced. In the case of this configuration in which the apparatuses having the databases are used to relay the transmission and reception of data among the different groups of the communication apparatuses, when the relay processing is required to be carried out at higher speed, the amount of communication among the relay apparatuses having the databases is desired to be reduced.

In view of the circumstances described above, the present invention is intended to provide relay apparatuses, a communication system including the relay apparatuses and a communication method, capable of reducing the amount of communication by virtue of a configuration in which, among data, each piece being formed of a pair of identification information and numerical information corresponding to the identification information, only the numerical information is combined appropriately and transmitted and received in the case of exchanging data among the relay apparatus having databases, whereby the amount of communication can be reduced.

A relay apparatus according to a first aspect of the present invention is a relay apparatus connected to external apparatuses for transmitting and receiving data containing numerical information and identification information of the numerical information, and equipped with means for receiving data from at least one of the external apparatuses, means for storing data in a database and means for transmitting data read from the database to at least one of the external apparatuses, thereby relaying transmission and reception of data among external apparatuses, the relay apparatus comprising means for creating a data frame containing numerical information on one or a plurality of pieces of data received from at least one of the external apparatuses; means for transmitting the created data frame to another relay apparatus; means for receiving a data frame from another relay apparatus; means for reading, in the case that a data frame is received, numerical information contained in the received data frame; and means for renewing numerical information on data in the database according to the read numerical information.

A relay apparatus according to a second aspect of the present invention is a relay apparatus equipped with means for storing positions and information lengths of the numerical information contained in a data frame for each number of pieces of numerical information contained in the data frame and each data type specified depending on identification information corresponding to the numerical information, and identification information corresponding to the respective pieces of the numerical information; means for transmitting information on the type of data frame when the data frame is transmitted to another relay apparatus; and means for specifying the type of a data frame when the data frame is received from another relay apparatus, wherein, when a data frame is received from said another relay apparatus, numerical information is derived from the data frame on the basis of the specified type.

A communication system according to a third aspect of the present invention is a communication system equipped with a plurality of communication apparatus groups, each group being formed of a plurality of communication apparatuses for transmitting and receiving data containing numerical information and identification information of the numerical information; and a plurality of relay apparatuses to which one or a plurality of communication apparatuses are connected in each of the plurality of communication apparatus groups and each of which is equipped with means for receiving data from at least one of the communication apparatuses, means for storing data in a database and means for transmitting data read from the database to at least one of the communication apparatuses, the plurality of relay apparatuses being connected mutually to relay transmission and reception of data among the communication apparatuses, wherein each of the relay apparatuses is equipped with means for creating a data frame containing numerical information on one or a plurality of pieces of data received from at least one of the communication apparatuses; means for transmitting the created data frame to another relay apparatus; means for receiving a data frame from another relay apparatus; means for reading, in the case that a data frame is received, numerical information contained in the received data frame, and means for renewing numerical information on data in the own database of each relay apparatus using the read numerical information.

A communication method according to a fourth aspect of the present invention is a communication method using a plurality of relay apparatuses to which one or a plurality of communication apparatuses are connected in each of a plurality of communication apparatus groups, each group being formed of the plurality of communication apparatuses for transmitting and receiving data containing numerical information and identification information of the numerical information, and which are mutually connected to relay transmission and reception of data among communication apparatuses and each of which receives data from at least one of the communication apparatuses of the group to which the relay apparatus is connected, stores data in a database, transmits data read from the database to at least one of the communication apparatuses, wherein each of the relay apparatuses creates a data frame containing numerical information on one or a plurality of pieces of data received from at least one of the communication apparatuses, transmits the created data frame to another relay apparatus, reads, in the case that a data frame is received from another relay apparatus, numerical information contained in the received data frame, renews numerical information on data in the own database of each relay apparatus using the read numerical information, and reads data from the renewed database and transmits the read data to at least one of the communication apparatuses of the group to which the relay apparatus is connected.

In the first, third and fourth aspects of the present invention, the external apparatuses (communication apparatuses) carry out transmission and reception, and in the case that data stored in the databases of the relay apparatuses is formed of a pair of information, i.e., numerical information and identification information of the numerical information, and when the data in the databases is exchanged among the relay apparatuses, the data exchange is carried out by transmitting and receiving data frames containing the numerical information. The larger the number of data types is, the longer the information length representing the identification information becomes, and the total information length of the identification information becomes longer depending on the number of pieces of data to be exchanged among the relay apparatuses. However, since the transmission and reception of the identification information of each piece of data are omitted in the transmission and reception among the relay apparatuses, the amount of communication is reduced.

In the second aspect of the present invention, the relay apparatus stores the position of the numerical information contained in the data frame and the identification information corresponding to the numerical information for each data type specified depending on the identification information corresponding to the numerical information in the data frame and the number of pieces of numerical information. Hence, when a data frame is transmitted among the relay apparatuses, the information on the type of the data frame is transmitted, whereby the relay apparatus having received the data frame can read the respective pieces of numerical information contained in the data frame.

In the case of the present invention, when the data in the own database of a relay apparatus is exchanged with that of another relay apparatus so that the data is relayed among different groups of external apparatuses (communication apparatuses), the transmission of identification information corresponding to the numerical information on the data contained in the database is omitted, whereby the amount of communication among the relay apparatuses can be reduced. Since the amount of communication among the relay apparatuses is reduced, the time required for the exchange of the data in the databases of the relay apparatuses can be shorted, and the data exchange can be completed at high speed. As a result, it is possible to ensure the uniformity of data and the immediacy of the relay among the different groups of external apparatuses.

The above and further objects and features will move fully be apparent from the following detailed description with accompanying drawings.

BRIEF DESCRIPTION OF THE SEVERAL VIEWS OF THE DRAWINGS

FIG. 5 is an explanatory view showing examples of contents of a correspondence table stored in a storage section of the relay apparatus constituting the vehicle-mounted communication system according to the present embodiment;

FIG. 10 is an explanatory view schematically showing another example of the process in which the databases of the relay apparatuses according to the present embodiment are renewed by the transmission and reception of trunk frames.

DETAILED DESCRIPTION

The present invention will be described below specifically on the basis of the drawings showing an embodiment thereof. In the embodiment described below, a case will be described as an example in which a communication system according to the present invention is applied to a vehicle-mounted communication system in which a plurality of ECUs for carrying out data transmission and reception are connected.

Figure 1:
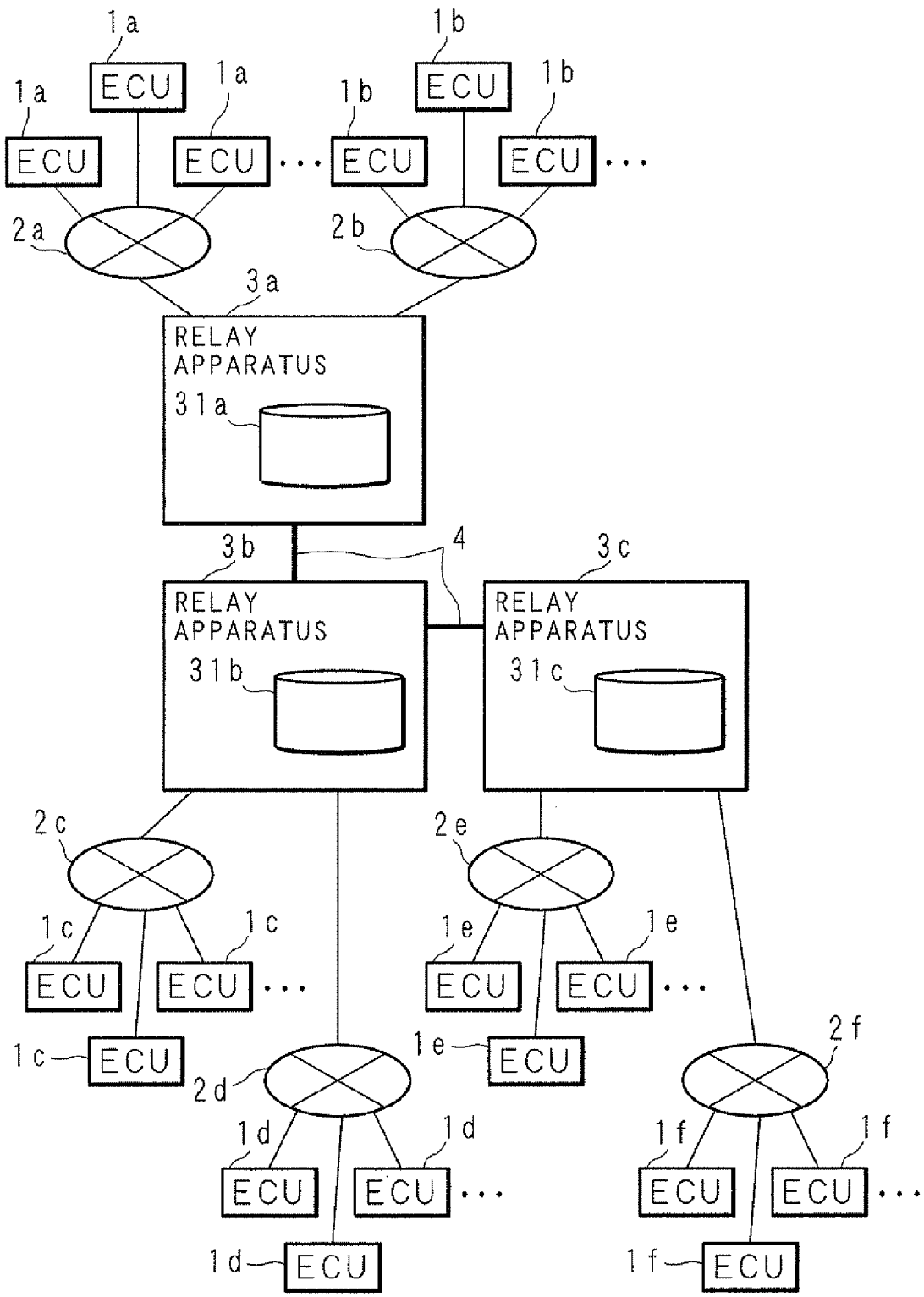
FIG. 1 is a view showing a configuration of a vehicle-mounted communication system according to the present embodiment.

FIG. 1 is a view showing a configuration of the vehicle-mounted communication system according to the present embodiment. The vehicle-mounted communication system includes ECUs (Electronic Control Units) $1a, 1a, \ldots, 1b, 1b, \ldots, 1c, 1c, \ldots, 1d, 1d, \ldots, 1e, 1e, \ldots, 1f, 1f, \ldots$ which are communication apparatuses for transmitting and receiving data and forms groups; communication lines $2a, 2b, 2c, 2d, 2e$ and $2f$ connected to the groups of ECUs $1a, 1a, \ldots, 1b, 1b, \ldots, 1c, 1c, \ldots, 1d, 1d, \ldots, 1e, 1e, \ldots, 1f, 1f, \ldots$, respectively, group by group; relay apparatuses $3a, 3b$ and $3c$, respectively connected to communication lines $2a, 2b, 2c, 2d, 2e$ and $2f$, for relaying data transmission and reception among the ECUs $1a, 1a, \ldots, 1b, 1b, \ldots, 1c, 1c, \ldots, 1d, 1d, \ldots, 1e, 1e, \ldots, 1f, 1f, \ldots$; and communication lines 4 for connecting the relay apparatuses $3a, 3b$ and $3c$. The vehicle-mounted communication system according to the present embodiment constitutes a trunk-type vehicle-mounted network in which the plurality of groups of the ECUs $1a, 1a, \ldots, 1b, 1b, \ldots, 1c, 1c, \ldots, 1d, 1d, \ldots, 1e, 1e, \ldots, 1f, 1f, \ldots$ are connected with one another via the relay apparatuses $3a, 3b$ and $3c$ connected to the communication lines 4 serving as trunk lines. For clarity of description, the communication lines $2a, 2b, 2c, 2d, 2e$ and $2f$ are hereafter referred to as branch lines $2a, 2b, 2c, 2d, 2e$ and $2f$, and the communication lines 4 are hereafter referred to as trunk lines 4.

The ECUs $1a, 1a, \ldots$ are connected to the branch line $2a$, the ECUs $1b, 1b, \ldots$ are connected to the branch line $2b$, the ECUs $1c, 1c, \ldots$ are connected to the branch line $2c$, the ECUs $1d, 1d, \ldots$ are connected to the branch line $2d$, the ECUs $1e, 1e, \ldots$ are connected to the branch line $2e$, and the ECUs $1f, 1f, \ldots$ are connected to the branch line $2f$. A bus type is used as a connection topology among the ECUs $1a, 1a, \ldots, 1b, 1b, \ldots, 1c, 1c, \ldots, 1d, 1d, \ldots, 1e, 1e, \ldots, 1f, 1f, \ldots$ via the branch lines $2a, 2b, 2c, 2d, 2e$ and $2f$. This is because the ECUs $1a, 1a, \ldots, 1b, 1b, \ldots, 1c, 1c, \ldots, 1d, 1d, \ldots, 1e, 1e, \ldots, 1f, 1f, \ldots$ transmit and receive data according to the CAN (controller area network) protocol as described later. However, any connection topology, such as star topology or daisy-chain topology, may be used.

The daisy-chain topology is used for the connection topology among the relay apparatuses $3a, 3b$ and $3c$ via the trunk lines 4. The relay apparatuses $3a, 3b$ and $3c$ are equipped with storage areas serving as databases $31a, 31b$ and $31c$, respectively.

The relay apparatus $3a$, basically, stores data transmitted from the ECUs $1a, 1a, \ldots, 1b, 1b, \ldots$ connected thereto via the branch lines $2a$ and $2b$ in the database $31a$ and transmits data read from the database $31a$ to the ECUs $1a, 1a, \ldots, 1b, 1b, \ldots$. Furthermore, the relay apparatus $3a$ transmits data received from the ECUs $1a, 1a, \ldots, 1b, 1b, \ldots$ to the other relay apparatuses $3b$ and $3c$ and stores data received from the other relay apparatuses $3b$ and $3c$ in the database $31a$. Similarly, the other relay apparatuses $3b$ and $3c$ store data received from the other relay apparatuses $3a, 3b$ and $3c$ in the databases $31b$ and $31c$. As a result, the databases $31a, 31b$ and $31c$ are synchronized so as to have the same contents, and the respective ECUs $1a, 1a, \ldots, 1b, 1b, \ldots, 1c, 1c, \ldots, 1d, 1d, \ldots, 1e, 1e, \ldots, 1f, 1f, \ldots$ connected to the different branch lines $2a, 2b, 2c, 2d, 2e$ and $2f$ can use the same data.

Figure 2:
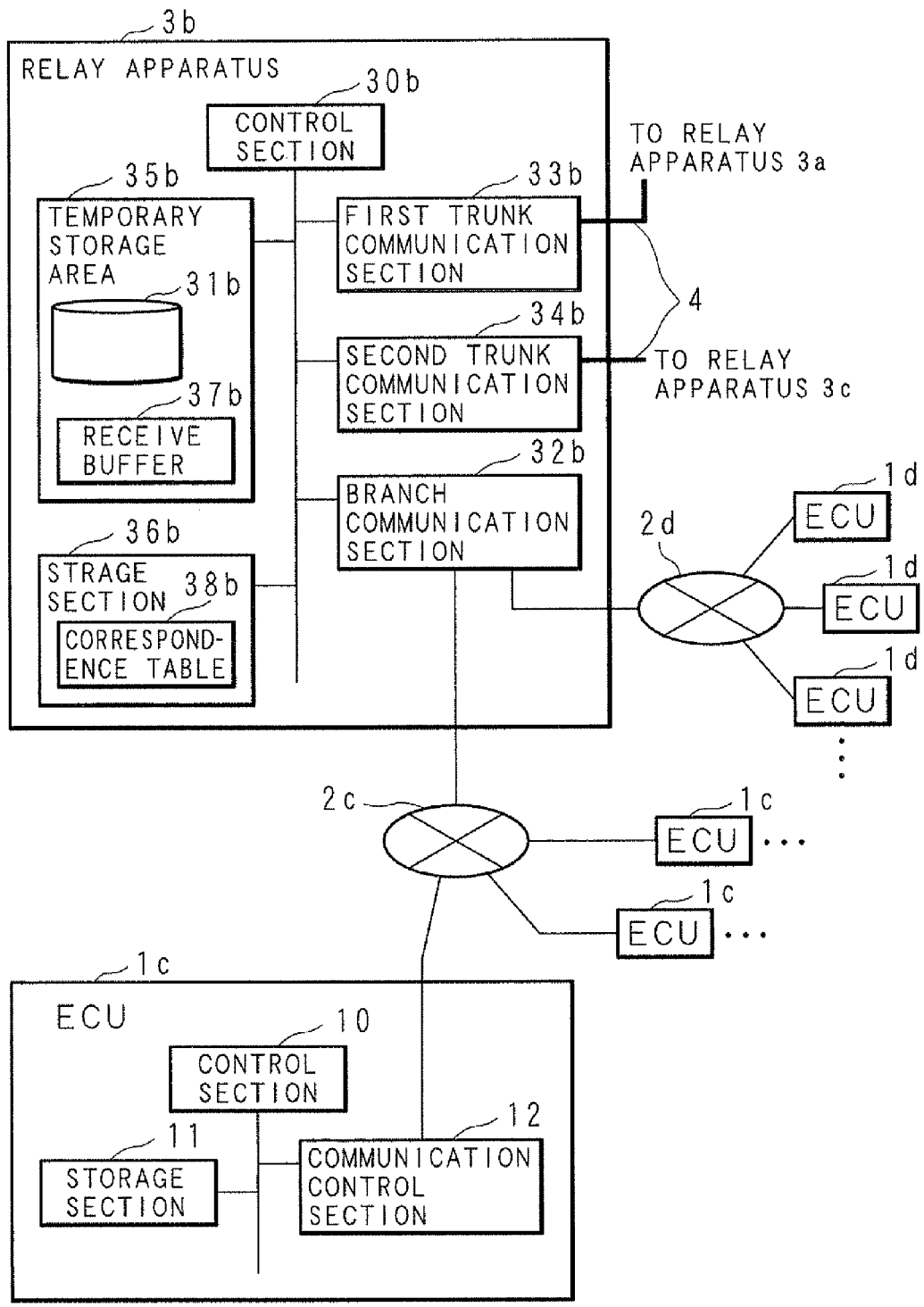
FIG. 2 is a block diagram showing internal configurations of an ECU and a relay apparatus constituting the vehicle-mounted communication system according to the present embodiment.

FIG. 2 is a block diagram showing internal configurations of the ECU $1c$ and the relay apparatus $3b$ constituting the vehicle-mounted communication system according to the present embodiment.

The ECU $1c$ is equipped with a control section 10 for controlling the operations of various components, a storage section 11 for storing data necessary for control, and a communication control section 12 for controlling communication with the branch line $2c$. Since the internal configurations of the other ECUs $1a, 1b, 1d, 1e$ and $1f$ are similar to that of the ECU $1c$, the detailed descriptions thereof are omitted.

The control section 10 of the ECU $1c$ controls the operations of the various components by virtue of the supply of power received from a power supply apparatus, such as a battery or an alternator of a vehicle, not shown.

The storage section 11 uses a volatile memory, and the control section 10 temporarily stores, in the storage section 11, various kinds of information generated during processing, measurement values represented by signals input from a sensor as described later or data received from the relay apparatus $3b$.

The communication control section 12 has the function of a network controller and achieves communication with the branch line $2c$. The control section 10 of the ECU $1c$ transmits and receives data via the communication control section 12.

The ECUs $1a, 1a, \ldots, 1b, 1b, \ldots, 1c, 1c, \ldots, 1d, 1d, \ldots, 1e, 1e, \ldots, 1f, 1f, \ldots$ configured as described above can transmit data containing numerical information on various kinds of physical quantities, such as measurement values, calculation values and control values, or can control the engine, brake, etc. using microcomputers. For example, the ECU $1c$ serves as an ABS (Antilock Brake System) and is connected to a sensor (not shown) for detecting the rotation speed of a wheel (wheel speed). The ECU $1c$ controls the brake on the basis of the wheel speed detected via the sensor at the braking of the vehicle and transmits the measurement value of the wheel speed as data to the relay apparatus $3b$ via the branch line $2c$.

Data transmitted from the ECUs $1a, 1a, \ldots, 1b, 1b, \ldots, 1c, 1c, \ldots, 1d, 1d, \ldots, 1e, 1e, \ldots, 1f, 1f, \ldots$ is formed of a pair of an attribute ID (identification data) for identifying the attribute of data, such as wheel speed, temperature or angle, and specific numerical information (attribute value) of the attribute ID. For example, data representing a wheel speed consists of a pair of an attribute ID "10" assigned to the wheel speed and an attribute value "3000 (rpm: revolutions per minute)." Furthermore, the numerical information also includes control values, represented by numerical information, for switching between on and off and among high, middle and low (on: 1, off: 0; high: 1, middle: 0, low: −1).

Moreover, data transmission and reception between the ECUs 1a, 1a, . . . , 1b, 1b, . . . , 1c, 1c, . . . , 1d, 1d, . . . , 1e, 1e, . . . , 1f, 1f, . . . and the relay apparatuses 3a, 3b and 3c are carried out by transmitting and receiving a "message" consisting of a plurality of pieces of data. The ECUs 1a, 1b, 1c, 1d, 1e, 1f transmit data groups obtained by their own operations as a messages when transmitting data through the communication control section 12.

The communication lines (branch lines) 2c and 2d are communication lines based on the CAN protocol, and the respective communication control sections 12 of the ECUs 1c, 1c, . . . and 1d, 1d, . . . transmit and receive messages on the basis of the CAN protocol via the branch lines 2c and 2d, respectively. In the case of transmitting a message on the basis of the CAN protocol, the ECUs 1c, 1c, . . . , 1d, 1d, . . . transmit the message containing a message ID, i.e., "CAN ID", specified for each combination of a plurality of pieces of data together with a group of attribute values corresponding to the combination.

Without being limited to this, the branch lines 2c and 2d may be capable of transmitting and receiving messages on the basis of protocols such as LIN (Local Interconnect Network), FlexRay (registered trademark), etc. The other branch lines 2a, 2b, 2e and 2f are similar to the branch lines 2c and 2d. The branch lines 2a, 2b, 2c, 2d, 2e and 2f may be formed of communication lines based on protocols different from each other depending on the type of data transmitted to and received from the ECUs 1a, 1a, . . . , 1b, 1b, . . . , 1c, 1c, . . . , 1d, 1d, . . . , 1e, 1e, . . . , 1f, 1f, . . . .

The relay apparatus 3b is equipped with a control section 30b for controlling the operations of the respective components; a branch communication section 32b connected to the branch lines 2c and 2d; a first trunk communication section 33b and a second trunk communication section 34b connected to the trunk lines 4; a temporary storage area 35b formed of a volatile memory, such as a DRAM (Dynamic Random Access Memory) or an SRAM (Static Random Access Memory); and a storage section 36b formed of a nonvolatile memory, such as an EPROM (Erasable Programmable Read-Only Memory), an EEPROM (Electrically EPROM) or a flash memory. Since internal configurations of the relay apparatuses 3a and 3c are similar to that of the relay apparatus 3b, the detailed descriptions thereof are omitted.

The control section 30b uses an MPU (Micro Processing Unit) and is configured so as to control the operations of the respective components by virtue of the supply of power received from a power supply apparatus, such as the alternator or the battery of the vehicle, not shown.

The branch communication section 32b achieves data transmission to and reception from the ECUs 1c, 1c, . . . , 1d, 1d, . . . connected thereto via the branch lines 2c and 2d. As described above, the data transmission and reception between the ECUs 1c, 1c, . . . , 1d, 1d, . . . and the relay apparatus 3b are carried out by the transmission and reception of messages. Furthermore, the branch communication section 32b has a plurality of ports and is configured so as to be capable of transmitting and receiving messages simultaneously via the respective ports. The branch communication section 32b provided for the relay apparatus 3b according to the present embodiment has eight ports and can transmit and receive messages simultaneously via the eight ports.

The first trunk communication section 33b and the second trunk communication section 34b achieve communication with the other relay apparatus 3a and 3c connected thereto via the trunk lines 4. The relay apparatus 3b can communicate with the relay apparatus 3a through the first trunk communication section 33b and can also communicate with the relay apparatus 3c through the second trunk communication section 34b. The control section 30b can simultaneously carry out communication with the relay apparatus 3a through the first trunk communication section 33b and communication with the relay apparatus 3c through the second trunk communication section 34b.

The control section 30b communicates with the other relay apparatuses 3a and 3c through the first trunk communication section 33b and the second trunk communication section 34b periodically at a regular period of 1 ms for example.

The relay apparatus 3a is also equipped with a first trunk communication section 33a and a second trunk communication section 34a, and the communication sections can carry out communication simultaneously. In the present embodiment, the relay apparatus 3a is connected to the relay apparatus 3b via the trunk line 4 through the second trunk communication section 34a. Since the relay apparatus 3a is not connected to a relay apparatus other than the relay apparatus 3b, the first trunk communication section 33a is not used. Furthermore, the relay apparatus 3c is also equipped with a first trunk communication section 33c and a second trunk communication section 34c. However, in the present embodiment, the relay apparatus 3c is connected to the relay apparatus 3b via the trunk line 4 through the first trunk communication section 33c, and the second trunk communication section 34c is not used. In the case that another relay apparatus is further connected to the relay apparatus 3c, a configuration may be formed in which said another relay apparatus is connected in a daisy-chain manner using the second trunk communication section 34c so that the relay apparatus 3c achieves communication with the relay apparatus 3b through the first trunk communication section 33c and communication with said another relay apparatus through the second trunk communication section 34c.

The temporary storage area 35b is provided with a storage area for the database 31b in which data is stored by the control section 30b. The database 31b may be provided in an area inside a storage unit located outside of the relay apparatus 3b and connected to the relay apparatus 3b so that data can be read and written. The temporary storage area 35b is provided with not only the database 31b but also a storage area for a receive buffer 37b for temporarily storing received data (messages).

A correspondence table 38b that is referred to when the control section 30b communicates with the other relay apparatuses 3a and 3c through the first trunk communication section 33b and the second trunk communication section 34b is stored beforehand in the storage section 36b. The details of the correspondence table 38b will be described later.

Communication processing between the ECUs 1a, 1a, . . . , 1b, 1b, . . . , 1c, 1c, . . . , 1d, 1d, . . . , 1e, 1e, . . . , 1f, 1f, . . . and the relay apparatuses 3a, 3b and 3c in the vehicle-mounted communication system configured as described above will be described below.

Figure 3:
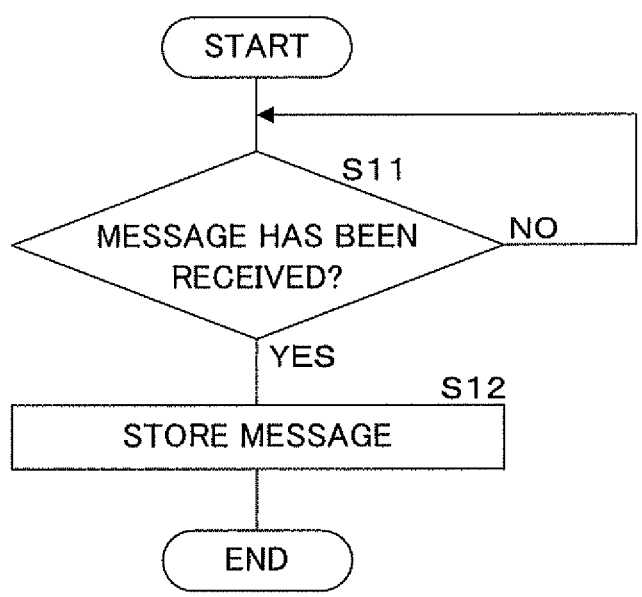
FIG. 3 is a flowchart showing an example of a procedure to be done in the case that a control section of the relay apparatus constituting the vehicle-mounted communication system according to the present embodiment receives a message.

FIG. 3 is a flowchart showing an example of a procedure to be done in the case that the control section 30b of the relay apparatus 3b constituting the vehicle-mounted communication system according to the present embodiment receives a message. Since procedures to be done by the other control sections 30a and 30c of the relay apparatuses 3a and 3c are similar to that to be done by the control section 30b of the relay apparatus 3b, the detailed descriptions thereof are omitted.

The control section 30b judges whether a message transmitted from any of the ECUs 1c, 1c, ..., 1d, 1d, ... connected thereto via the branch lines 2c and 2d has been received through the branch communication section 32b (at step S11). In the case that the control section 30b judges that no message has been received (NO at step S11), the control section 30b returns the procedure to step S11.

In the case that the control section 30b judges that a message has been received (YES at step S11), the control section 30b stores the received message once in the receive buffer 37b (at step S12), thereby completing the procedure to be done in the case that the message has been received.

An attribute value group contained in the message stored in the receive buffer 37b is stored for each attribute value ID at a timing described later. In other words, data consisting of a pair of an attribute value ID and an attribute value is stored in the database 31b. The control section 30b creates a message from the attribute value group of the data stored in the database 31b and transmits the message as necessary to the ECUs 1c, 1c, ..., 1d, 1d, ... requiring the message through the branch communication section 32b. The timing of the transmission is scheduled for each of the destination ECUs 1c, 1c, ..., 1d, 1d, ..., for example. The control section 30b may create a message by referring to the schedule stored in the storage section 36b and may transmit the message. Alternatively, the control section 30b may monitor the attribute value stored in the database 31b and may transmit the message containing the attribute value to the ECUs 1c, 1c, ..., 1d, 1d, ... requiring the message in the case that the attribute value is changed by the renewal of the database 31b.

Next, processing to be carried out when the control section 30b of the relay apparatus 3b communicates with the other relay apparatuses 3a and 3c through the first trunk communication section 33b and the second trunk communication section 34b will be described below.

When exchanging data stored in the database 31b with data stored in the other relay apparatuses 3a and 3c, the control section 30b does not read data consisting of a pair of an attribute value ID and an attribute value from the database 31b to transmit the data, but carries out transmission and reception using the message stored once in the receive buffer 37b. More specifically, data is transmitted using a frame containing gathered messages. The frame that is used at this time is hereafter referring to as a trunk frame.

A trunk frame using messages is transmitted for the following reason: since a message to be transmitted and received according to CAN is formed of one or a plurality of combinations of attribute values and a CAN ID is specified for each combination, the transmission of the attribute value ID for each attribute value can be omitted. It may be possible that a data frame in which attribute value groups are gathered more efficiently than the messages transmitted from the ECUs 1c, 1c, ..., 1d, 1d, ... is specified, and a data frame ID may be specified depending on the number of attribute values contained in the data frame and their attribute value IDs.

Figure 4A:
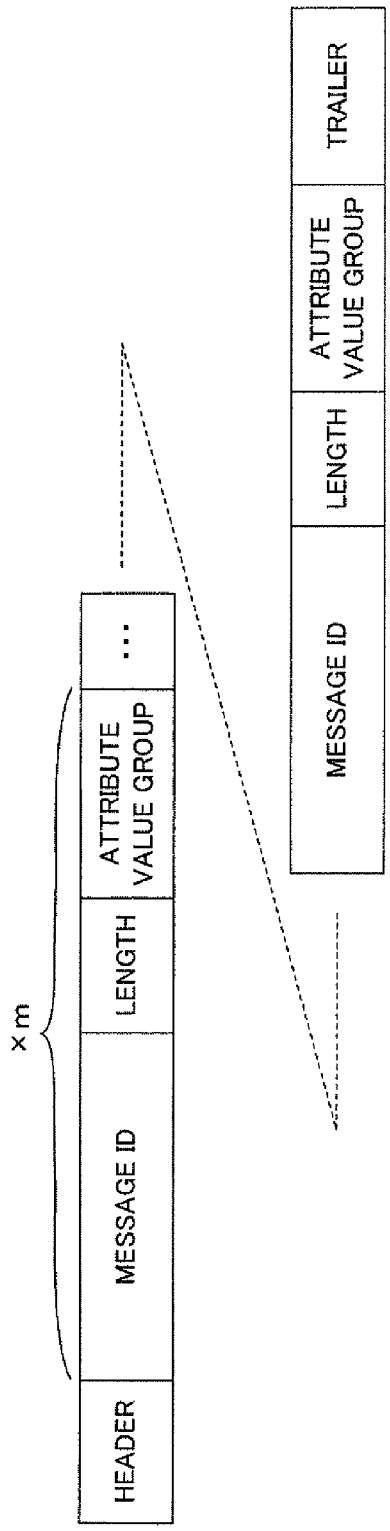
FIGS. 4A and 4B are explanatory views showing format examples of a trunk frame transmitted by the control sections of the relay apparatuses constituting the vehicle-mounted communication system according to the present embodiment.
Figure 4B:
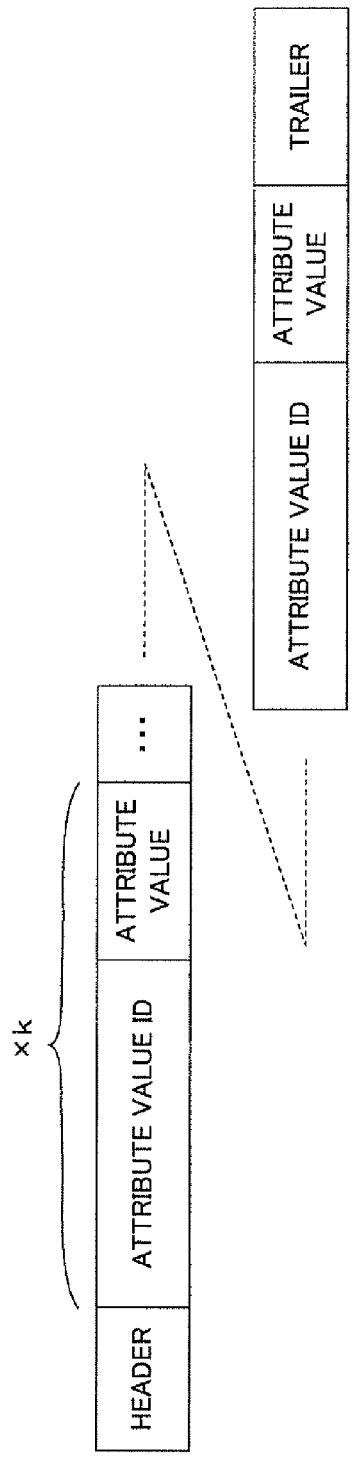

FIGS. 4A and 4B are explanatory views showing format examples of a trunk frame transmitted by the control sections 30a, 30b and 30c of the relay apparatuses 3a, 3b and 3c constituting the vehicle-mounted communication system according to the present embodiment. FIG. 4A shows a format example of a trunk frame transmitted by the control sections 30a, 30b and 30c of the relay apparatuses 3a, 3b and 3c according to the present embodiment. FIG. 4B shows for comparison a format example in the case of the transmission of a plurality of data formed of an attribute value ID and an attribute value.

As shown in FIG. 4A, the format of the trunk frame is formed such that a header is added to the head of the trunk frame and a trailer indicating the end of the trunk frame is added to the end thereof. Furthermore, m messages received by the relay apparatus 3a from the ECUs 1a, 1a, ..., 1b, 1b, ... and stored in the receive buffer 37a of the relay apparatus 3a are contained between the header and the trailer of the trunk frame to be transmitted from the relay apparatus 3a. Moreover, each message contains a message ID (CAN ID) predetermined depending on the number of attribute value groups and the combination of attribute value IDs and also contains the total size (information length) of the attribute value groups following immediately thereafter. In this case, the maximum total size of the attribute value groups contained in the message is eight bytes. In addition, a field itself representing the size (information length) of the field of the attribute value groups in byte units consists of four bits because eight should only be represented at the maximum. Since the CAN ID is represented by 11 bits, the size of one message is 10 bytes when rounded up to bytes.

FIG. 4B shows for comparison with FIG. 4A a format example in the case of the transmission of a plurality of data formed of an attribute value ID and an attribute value. Also in this case, a header is added to the head and a trailer indicating the end of the transmission is added to the end. In the case that k attribute values are contained in a message received from the ECUs 1a, 1a, ..., 1b, 1b, ... by the relay apparatus 3a and stored in the receive buffer 37a, k pairs of an attribute value ID and an attribute value are contained between the header and the trailer. In this case, it is assumed that the attribute value ID is represented by two bytes.

FIG. 5 is an explanatory view showing examples of contents of the correspondence table 38b stored in the storage section 36b of the relay apparatus 3b constituting the vehicle-mounted communication system according to the present embodiment. In FIG. 5, n is an arbitrary natural number. As shown in the explanatory view of FIG. 5, the number of attribute values contained in a message and an attribute value ID contained in the message, the position (order) of the attribute value in the message and the information length (bit units) of the attribute value for each attribute value are stored in the table so as to correspond to a message ID. An example of a content in FIG. 5 indicates that "two" attribute values are contained in the message having a message ID of "1". With respect to the first attribute value contained in the message having a message ID of "1", the attribute value ID thereof is "1" and the attribute value has an information length of "1" bit and is contained at the "first" position, and with respect to the second attribute value, the attribute value ID thereof is "2", and the attribute value has an information length of "1" bit and is contained at the "second" position.

Another example of a content in FIG. 5 indicates that "four" attribute values are contained in the message having a message ID of "2". With respect to the first attribute value contained in the message having a message ID of "2", the attribute value ID thereof is "20" and the attribute value has an information length of "1" bit and is contained at the "second" position, and with respect to the second attribute value, the attribute value ID thereof is "50", and the attribute value has an information length of "8" bits and is contained at the "fourth" position. A still another example indicates that "n" attribute values are contained in the message having a message ID of "3". With respect to the first attribute value contained in the message having a message ID of "3", the attribute value ID thereof is "8" and the attribute value has an information length of "3" bit and is contained at the "fourth" position, and with respect to the second attribute value, the attribute value ID thereof is "5", and the attribute value has an information length of "4" bits and is contained at the "n-th" position. Furthermore, a yet another example indicates that "64" attribute values are contained in the message having a message ID of "4". With respect to the first attribute value contained in the message having a message ID of "4", the attribute value ID thereof is "1" and the attribute value has an information length of "1" bit and is contained at the "first" position, and with respect to the second attribute value, the attribute value ID thereof is "2", and the attribute value has an information length of "1" bit and is contained at the "second" position.

Upon reception of a trunk frame having such a format as shown in FIG. 4A, the control sections 30a, 30b and 30c of the relay apparatuses 3a, 3b and 3c refer to the correspondence tables 38a, 38b and 38c, respectively on the basis of the message IDs, and read attribute values. Hence, the relay apparatuses 3a, 3b and 3c carry out transmission and reception using messages containing only attribute values without containing attribute value IDs. The control sections 30a, 30b and 30c of the relay apparatuses 3a, 3b and 3c can recognize attribute values contained in the messages and read the attribute values.

Figure 6:
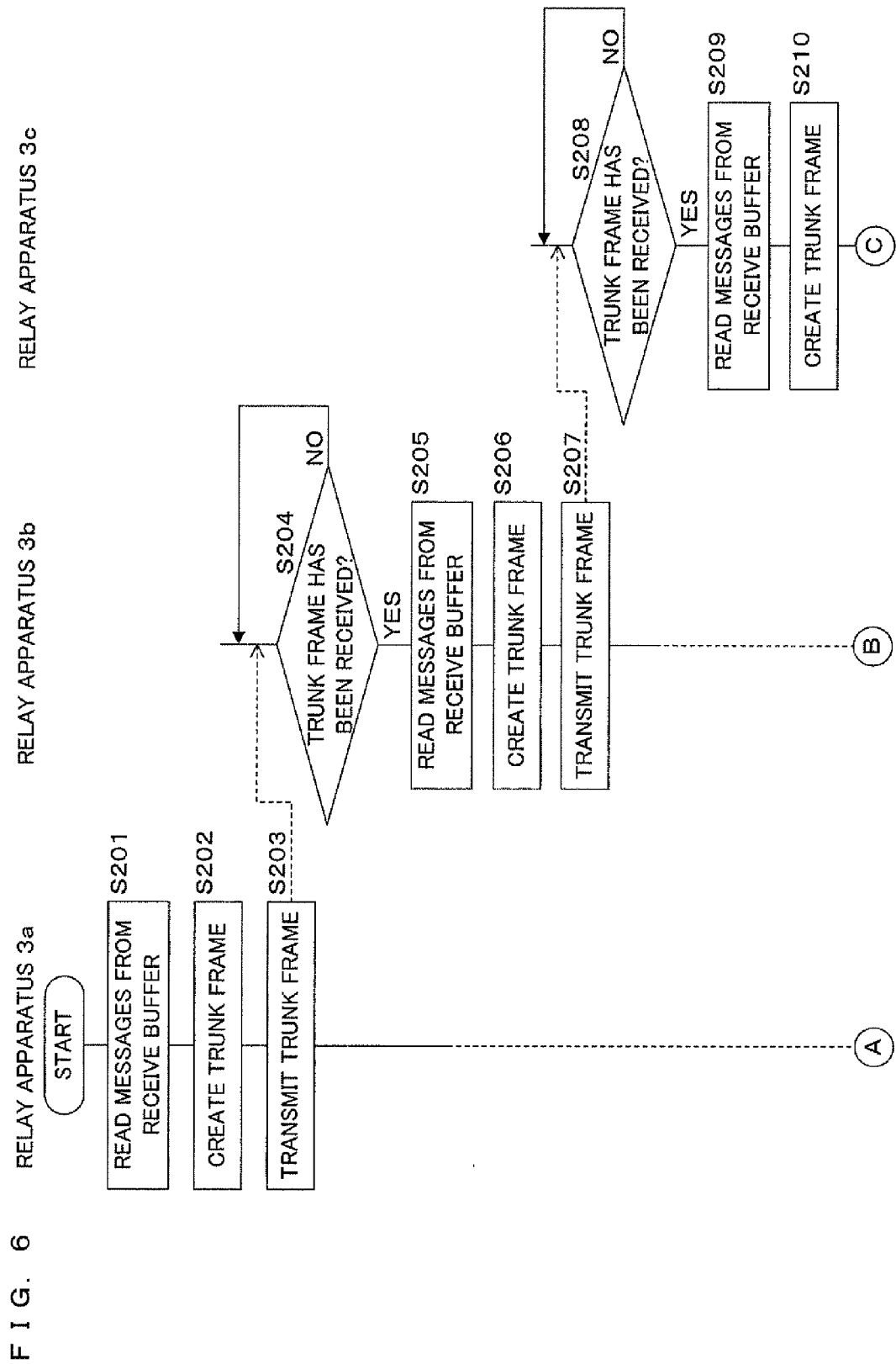
FIG. 6 is a flowchart showing an example of a procedure in which trunk frames are transmitted and received among the relay apparatuses constituting the vehicle-mounted communication system according to the present embodiment.
Figure 7:
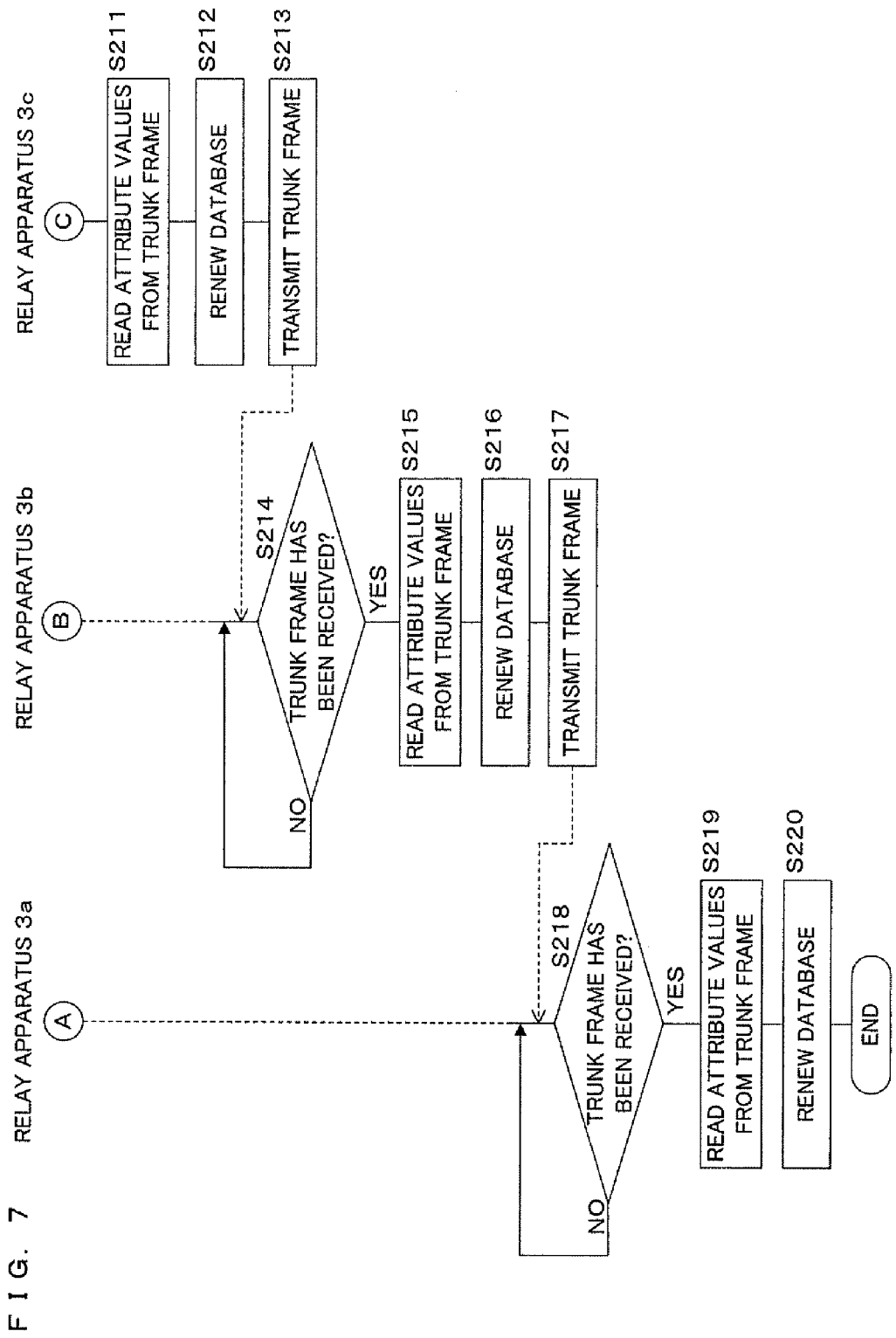
FIG. 7 is a flowchart showing an example of a procedure in which trunk frames are transmitted and received among the relay apparatuses constituting the vehicle-mounted communication system according to the present embodiment.

FIGS. 6 and 7 are flowcharts showing an example of a procedure in which trunk frames are transmitted and received among the relay apparatuses 3a, 3b and 3c constituting the vehicle-mounted communication system according to the present embodiment. In the relay apparatuses 3a, 3b and 3c connected in a daisy-chain manner, the procedure described below is repeated periodically, with the relay apparatus 3a as a start point, at a regular period of 1 ms for example.

When the period is reached, the control section 30a of the relay apparatus 3a refers to the correspondence table 38a of the storage section 36a and reads messages from the receive buffer 37a in which the messages received from any of the ECUs 1a, 1a, . . . , 1b, 1b, . . . are temporarily stored (at step S201). The control section 30a then creates a trunk frame (at step S202) and transmits the created trunk frame to the relay apparatus 3b through the second trunk communication section 34b (at step S203).

The control section 30b of the relay apparatus 3b judges whether the trunk frame has been received through the first trunk communication section 33b (at step S204). In the case that the control section 30b judges that the trunk frame has not been received (NO at step S204), the control section 30b returns the procedure to step S204. In the case that the control section 30b judges that the trunk frame has been received (YES at step S204), the control section 30b reads messages from the receive buffer 37b in which the messages received from any of ECUs 1c, 1c, . . . , 1d, 1d, . . . are temporarily stored (at step S205), and then creates a trunk frame to which the read messages are added (at step S206). The control section 30b of the relay apparatus 3b transmits the created trunk frame to the relay apparatus 3c through the second trunk communication section 34b (at step S207).

The control section 30c of the relay apparatus 3c judges whether the trunk frame has been received through the first trunk communication section 33c (at step S208). In the case that the control section 30c judges that the trunk frame has not been received (NO at step S208), the control section 30c returns the procedure to step S208. In the case that the control section 30c judges that the trunk frame has been received (YES at step S208), the control section 30c reads messages from the receive buffer 37c in which the messages received from any of ECUs 1e, 1e, . . . , 1f, 1f, . . . are temporarily stored (at step S209), and then creates a trunk frame to which the read message is added (at step S210).

Since the relay apparatus 3c is located at the end point of the daisy-chain connection of the relay apparatuses 3a, 3b and 3c, in the case that the control section 30c of the relay apparatus 3c has received the trunk frame from the relay apparatus 3b, it is assumed that the relay apparatus 3c has obtained the messages stored in the receive buffers 37a, 37b and 37c of all the relay apparatuses 3a, 3b and 3c. Hence, the control section 30c of the relay apparatus 3c adds its own message to the received trunk frame and reads the attribute values from the message group of the trunk frame to which the message is added by referring to the correspondence table 38c (at step S211) and renews the database 31c of the relay apparatus 3c using the read attribute values (at step S212). Furthermore, the control section 30c of the relay apparatus 3c transmits the created trunk frame to the relay apparatus 3b through the first trunk communication section 33c (at step S213).

After transmitting the trunk frame created by the control section 30b (at step S207), the control section 30b of the relay apparatus 3b judges whether the trunk frame has been received from the relay apparatus 3c through the second trunk communication section 34b (at step S214).

Since the relay apparatuses 3a, 3b and 3c are connected in daisy-chain manner, the trunk frame transmitted from the relay apparatus 3c located at the end point of the connection has a meaning of acknowledgement indicating that the trunk frames transmitted by the relay apparatuses 3a and 3b themselves have reached the relay apparatus 3c located at the end point.

In the case that the control section 30b of the relay apparatus 3b judges that the trunk frame has not been received from the relay apparatus 3c through the second trunk communication section 34b (NO at step S214), the control section 30b returns the procedure to step S214 and waits. In the case that the control section 30b judges that the trunk frame has been received from the relay apparatus 3c through the second trunk communication section 34b (YES at step S214), since the received trunk frame contains the messages stored in the receive buffers 37a, 37b and 37c of all the relay apparatuses, i.e., the relay apparatus 3a, the relay apparatus 3b itself and the relay apparatus 3c, the control section 30b reads attribute values from the message group of the trunk frame by referring to the correspondence table 38b (at step S215). Furthermore, the control section 30b of the relay apparatus 3b renews the database 31b of the relay apparatus 3b using the read attribute values (at step S216). Moreover, the control section 30b of the relay apparatus 3b transmits the trunk frame received from the relay apparatus 3c to the relay apparatus 3a through the first trunk communication section 33b (at step S217).

After transmitting the trunk frame created by the control section 30a (at step S203), the control section 30a of the relay apparatus 3a judges whether the trunk frame has been received from the relay apparatus 3b through the second trunk communication section 34a (at step S218). The trunk frame transmitted from the relay apparatus 3b has a meaning of acknowledgement indicating that the trunk frame transmitted by the relay apparatus 3a itself has reached the relay apparatus 3c located at the end point.

In the case that the control section 30a of the relay apparatus 3a judges that the trunk frame has not been received from the relay apparatus 3b through the second trunk communication section 34a (NO at step S218), the control section 30a returns the procedure to step S218 and waits. In the case that the control section 30a judges that the trunk frame has been received from the relay apparatus 3b through the second trunk communication section 34a (YES at step S218), since the received trunk frame contains the messages stored in the receive buffers 37a, 37b and 37c of all the relay apparatuses, i.e., the relay apparatus 3a itself, the relay apparatus 3b and the relay apparatus 3c, the control section 30a reads attribute values from the message group of the trunk frame by referring to the correspondence table 38a (at step S219), and renews the database 31a of the relay apparatus 3a using the read attribute values (at step S220), thereby completing the procedure.

Figure 8:
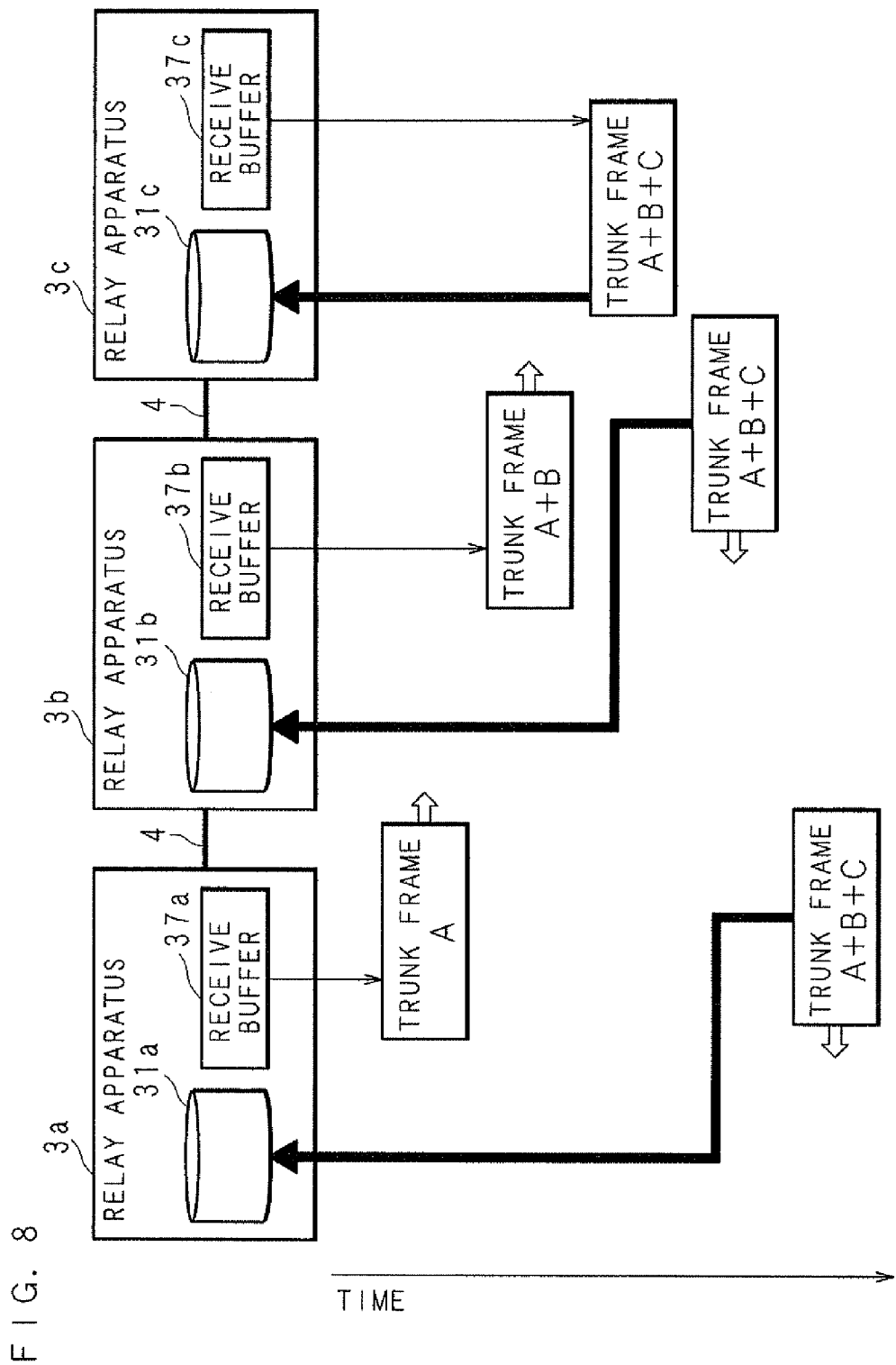
FIG. 8 is an explanatory view schematically showing a process in which databases of the relay apparatuses according to the present embodiment are renewed by the transmission and reception of trunk frames.

Next, the procedure shown in the flowcharts of FIGS. 6 and 7 will be described below using a specific example. FIG. 8 is an explanatory view schematically showing a process in which the databases 31a, 31b and 31c of the relay apparatuses 3a, 3b and 3c according to the present embodiment are renewed by the transmission and reception of trunk frames.

The explanatory view of FIG. 8 is a block diagram showing the daisy-chain connection of the relay apparatuses 3a, 3b and 3c and the configurations of the databases 31a, 31b and 31c and the receive buffers 37a, 37b and 37c of the respective relay apparatuses 3a, 3b and 3c. As described above, the relay apparatus 3a is used as the start point and the relay apparatus 3c is used as the end point. Furthermore, the explanatory view of FIG. 8 chronologically shows how the trunk frames are transmitted and received by carrying out the procedure shown in the flowcharts of FIGS. 6 and 7 using the control sections 30a, 30b and 30c of the relay apparatuses 3a, 3b and 3c.

As shown in the flowcharts of FIGS. 6 and 7, a trunk frame, which contains an attribute value group A since a plurality of messages are contained in the trunk frame, is transmitted from the relay apparatus 3a used as the start point to the relay apparatus 3b via the trunk line 4. In the case that the trunk frame transmitted from the relay apparatus 3a is received by the relay apparatus 3b, the trunk frame to which an attribute value group B is added and which contains the attribute value group A is transmitted from the relay apparatus 3b to the relay apparatus 3c via the trunk line 4. In the case that the trunk frame transmitted from the relay apparatus 3b and containing the attribute value groups A and B is received by the relay apparatus 3c, the attribute value groups A and B are added to the trunk frame containing attribute value group C. This creates a trunk frame containing the attribute value groups A, B and C of the data received from the ECUs 1a, 1a, . . . , 1b, 1b, . . . , 1c, 1c, . . . , 1d, 1d, . . . , 1e, 1e, . . . , 1f, 1f, . . . and stored in the receive buffers 37a, 37b and 37c of all the relay apparatuses, i.e., the relay apparatuses 3a, 3b and 3c.

In the relay apparatus 3c located at the end point, the database 31c is renewed using the attribute values read from the trunk frame containing the attribute value groups A, B and C. The trunk frame containing the attribute value groups A, B and C is transmitted from the relay apparatus 3c to the relay apparatus 3b and from relay apparatus 3b to the relay apparatus 3a. Also in the relay apparatus 3b and the relay apparatus 3a, the databases 31b and 31a are renewed in this order using the attribute values read from the trunk frame containing the attribute value groups A, B and C.

Since the databases 31a, 31b and 31c are renewed using the attribute values read from trunk frames containing the attribute value groups A, B and C and having the same contents, the contents of the databases 31a, 31b and 31c are synchronized to the same contents. When transmitting data to the ECUs 1a, 1a, . . . , 1b, 1b, . . . , 1c, 1c, . . . , 1d, 1d, . . . , 1e, 1e, . . . , 1f, 1f, . . . , the relay apparatuses 3a, 3b and 3c transmit data formed of the attribute values read from the databases 31a, 31b and 31c in the form of being contained in messages. As a result, even the ECUs 1a, 1a, . . . , 1b, 1b, . . . , 1c, 1c, . . . , 1d, 1d, . . . , 1e, 1e, . . . , 1f, 1f, . . . connected to the different branch lines 2a, 2b, 2c, 2d, 2e and 2f receive the same attribute values. In other words, it is possible to avoid a situation in which the specific values of the wheel speeds received by the ECUs 1b and 1c respectively connected to the different branch lines 2b and 2c are respectively 3000 (rpm) and 2500 (rpm), for example, thus different from each other.

Furthermore, since the present embodiment is configured so that the communication among the relay apparatuses 3a, 3b and 3c via the trunk lines 4 is carried out according to the format of the trunk frame in which a plurality of messages containing a plurality of attribute value groups are further contained, the transmission and reception of an attribute value ID for each attribute value is omitted, whereby the amount of communication is reduced. The effect of the reduction in the amount of communication will be described below by giving specific values.

The relay apparatuses 3a, 3b and 3c repeat the procedure shown in the flowcharts of FIGS. 6 and 7 every 1 ms and transmit and receive the trunk frames as shown in the explanatory view of FIG. 8. A case in which a message containing 64 one-bit attribute values is received four times at the eight ports of the respective branch communication sections 32a, 32b and 32c of the relay apparatuses 3a, 3b and 3c until the period of 1 ms is reached is taken as an example and described below.

When the relay apparatus 3a used as the start point creates a trunk frame, 2048 (=8 ports×4 messages (the number of messages per port)×64 (the number of attribute values contained in one message)) one-bit attribute values are stored in each of the receive buffers 37a, 37b and 37c.

The amount of communication required when the relay apparatus 3a transmits attribute values to the relay apparatus 3b using the trunk frame shown in FIG. 4A is calculated using the following expression 1. In this case, it is assumed that 64 one-bit attribute values (eight bytes) are contained in one message. Hence, one trunk frame containing 32 messages is transmitted.

$$\{(ID\_L + DLC\_L + D\_L) \times m\} + H\_L + T\_L = \qquad (1)$$

$$\{(11 \text{ (bits)} + 4 \text{ (bits)} + 8 \text{ (bytes)}) \times 32\} + H\_L + T\_L =$$

$$\{(10 \text{ (bytes)} \times 32\} + H\_L + T\_L = 320 \text{ (bytes)} + H\_L + T\_L$$

wherein
ID_L: the information length of a message ID
DLC_L: the information length of a field representing the information length of an attribute value group
D_L: the information length of an attribute value group
m: the number of messages
H_L: the information length of a header
T_L: the information length of a trailer Hence, as shown in the explanatory view of FIG. 8, the amount of communication from the relay apparatus 3a to the relay apparatus 3b, from the relay apparatus 3b to the relay apparatus 3c, from the relay apparatus 3c to the relay apparatus 3b and from the relay apparatus 3b to the relay apparatus 3a by the time when the databases 31a, 31b and 31c are synchronized is calculated using the following expression 2.

$$\{1 \times 320 \text{ (bytes)} + H\_L + T\_L\} \qquad (2)$$

(from the relay apparatus 3a to the relay apparatus 3b) +

$$\{2 \times 320 \text{ (bytes)}\}$$

(from the relay apparatus 3b to the relay apparatus 3c) +

$$\{3 \times 320 \text{ (bytes)}\}$$

(from the relay apparatus 3c to the relay apparatus 3b) +

-continued $$\{3 \times 320 \text{ (bytes)}\} \text{ (from the relay apparatus}$$
$$3b \text{ to the relay apparatus } 3a) =$$
$$2880 \text{ (bytes)} + (\text{H\_L} + \text{T\_L})$$

According to the expression 2, 2880 bytes of information is required to be transmitted and received via the trunk lines 4 within the period of every 1 ins. In the case that the communication speed of the trunk line 4 is 100 Mbps, the time required for the transmission and reception of 2880 bytes of information is approximately 230 μs. The transmission and reception of 2880 bytes of information can be carried out sufficiently within the period of every 1 ms.

For comparison, as shown in FIG. 4B, in the case of a configuration in which the relay apparatus 3a transmits attribute values to the relay apparatus 3b using a format containing pairs of an attribute value ID and an attribute value, the number of the pairs being equal to the number of the attribute values, the amount of communication required for transmission from the relay apparatus 3a used as the start point to the relay apparatus 3b is calculated according to the following expression 3.

$$\{(\text{Information length of attribute value } ID + \text{information length of} \quad (3)$$
$$\text{attribute value}) \times \text{number of attribute values}\} +$$
$$\text{information length of header} + \text{information length of trailer} =$$
$$\{(2 \text{ (bytes)} + 1 \text{ (bit)}) \times 2048\} + \text{h\_L} + \text{t\_L} =$$
$$4352 \text{ (bytes)} + \text{h\_L} + \text{t\_L}$$

wherein
h_L: the information length of the header
t_L: the information length of the trailer Hence, the amount of communication from the relay apparatus 3a to the relay apparatus 3b, from the relay apparatus 3b to the relay apparatus 3c, from the relay apparatus 3c to the relay apparatus 3b and from the relay apparatus 3b to the relay apparatus 3a is calculated using the following expression 4.

$$\{1 \times 4352 \text{ (bytes)} + \text{h\_L} + \text{t\_L}\} \quad (4)$$
$$\text{(from the relay apparatus } 3a \text{ to the relay apparatus } 3b) +$$
$$\{2 \times 4352 \text{ (bytes)}\}$$
$$\text{(from the relay apparatus } 3b \text{ to the relay apparatus } 3c) +$$
$$\{3 \times 4352 \text{ (bytes)}\} \text{ (from the relay apparatus } 3c \text{ to}$$
$$\text{the relay apparatus } 3b) + \{3 \times 4352 \text{ (bytes)}\}$$
$$\text{(from the relay apparatus } 3b \text{ to the relay apparatus } 3a) =$$
$$39168 \text{ (bytes)} + (\text{h\_L} + \text{t\_L})$$

According to the expression 4, 39168 bytes of information is required to be transmitted and received via the trunk lines 4 within the period of every 1 ms. In the case that the communication speed of the trunk line 4 is 100 Mbps, the time required for the transmission and reception of 39168 bytes of information is 3 ms. Hence, the transmission and reception of the information cannot be carried out within the period of every 1 ms.

In the case that data is transmitted and received so that the contents of the databases 31a, 31b and 31c are synchronized among the relay apparatuses 3a, 3b and 3c, a trunk frame having such a format as shown in FIG. 4A is created and then transmitted and received, whereby the amount of communication among the relay apparatuses 3a, 3b and 3c can be reduced up to approximately 1/10. As a result, the time required for the synchronization of the databases 31a, 31b and 31c among the relay apparatuses 3a, 3b and 3c can be reduced, and the synchronization can be completed at high speed. Furthermore, it is possible to ensure the uniformity of data and the immediacy of relay among the ECUs 1a, 1a, . . . , 1b, 1b, . . . , 1c, 1c, . . . , 1d, 1d, . . . , 1e, 1e, . . . , 1f, 1f, connected to the different branch lines 2a, 2b, 2c, 2d, 2e and 2f.

In the configuration of the above-mentioned vehicle-mounted communication system, data is relayed via the three relay apparatuses 3a, 3b and 3c. However, even in the case of a configuration in which, for example, five relay apparatuses are connected in a daisy-chain manner, the amount of communication required for the transmission and reception in the period of every 1 ms is 9600 bytes. When the communication speed of the trunk line is 100 Mbps, the time required for the transmission and reception is approximately 770 μs, whereby the transmission and reception can be carried out within the period.

In the above-mentioned descriptions, the three relay apparatuses 3a, 3b and 3c are configured so that the transmission and reception of trunk frames can be carried out cyclically from the relay apparatus 3a to the relay apparatus 3b, from the relay apparatus 3b to the relay apparatus 3c, from the relay apparatus 3c to the relay apparatus 3b and the relay apparatus 3b to the relay apparatus 3a. However, the relay apparatus 3b can carry out transmission and reception simultaneously through the first trunk communication section 33b and the second trunk communication section 34b. Hence, the relay apparatus 3b may carry out the transmission of trunk frames without waiting for the reception of trunk frames from the other relay apparatuses 3a and 3c.

Figure 9:
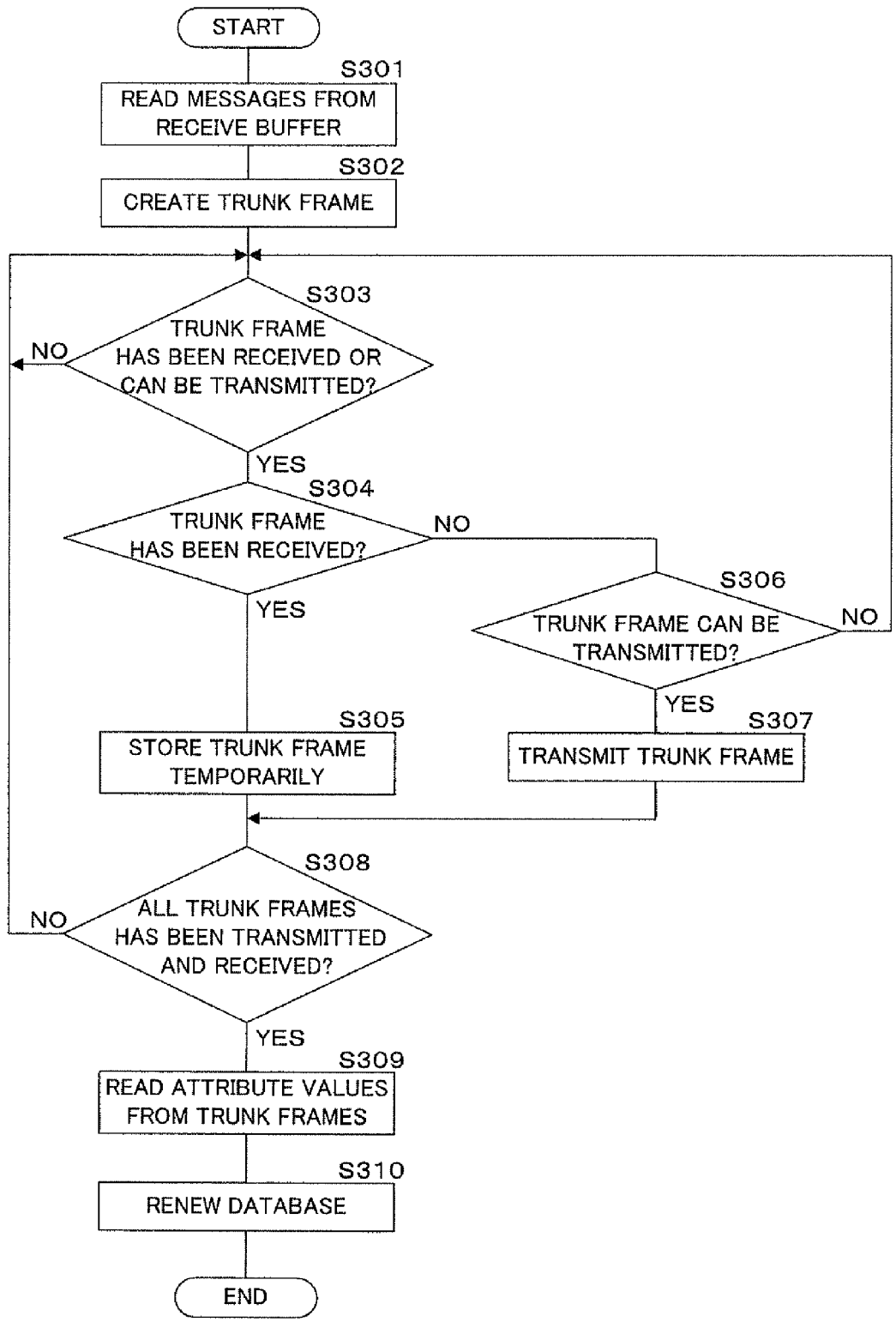
FIG. 9 is a flowchart showing another example of the procedure in which trunk frames are transmitted and received among the relay apparatuses constituting the vehicle-mounted communication system according to the present embodiment.

FIG. 9 is a flowchart showing another example of the procedure in which trunk frames are transmitted and received among the relay apparatuses 3a, 3b and 3c constituting the vehicle-mounted communication system according to the present embodiment. The flowchart of FIG. 9 shows a procedure to be done by the control section 30b of the relay apparatus 3b. Since the procedures to be done by the control sections 30a and 30c of the other relay apparatuses 3a and 3c are similar to that to be done by the control section 30b, the detailed descriptions thereof are omitted.

The relay apparatus 3b repeats the procedure described below periodically at a regular period of 1 ms.

When the period is reached, the control section 30b refers to the correspondence table 38b of the storage section 36b and reads messages from the receive buffer 37b in which the messages received from the ECUs 1c, 1c, . . . , 1d, 1d, . . . are temporarily stored (at step S301), and the control section 30b creates a trunk frame containing the messages received from the ECUs 1c, 1c, . . . , 1d, 1d, . . . (at step S302).

The control section 30b judges whether the reception of a trunk frame from either of the other relay apparatuses 3a and 3c has been started through the first trunk communication section 33b or the second trunk communication section 34b or whether the relay apparatus 3b has a trunk frame to be transmitted and the trunk frame can be transmitted through the first trunk communication section 33b or the second trunk communication section 34b (at step S303). The control section 30b can simultaneously carry out transmission or reception through the first trunk communication section 33b and transmission or reception through the second trunk communication section 34b.

In the case that the reception of a trunk frame has not been started from the first trunk communication section 33b or the second trunk communication section 34b and that the relay apparatus 3b has no trunk frame to be transmitted (NO at step S303), the control section 30b returns the procedure to step S303.

In the case that the control section 30b judges that the reception of a trunk frame has started from either of the other relay apparatuses 3a and 3c through the first trunk communication section 33b or the second trunk communication section 34b or whether the relay apparatus 3b has a trunk frame to be transmitted and the trunk frame can be transmitted through the first trunk communication section 33b or the second trunk communication section 34b (YES at step S303), the control section 30b judges whether the trunk frame has been received (at step S304). In the case that the control section 30b judges that the trunk frame has been received (YES at step S304), the control section 30b temporarily stores the received trunk frame in the temporary storage area 35b (at step S305).

In the case that the control section 30b judges that no trunk frame has been received at step S304 (NO at step S304), the control section 30b judges whether the trunk frame can be transmitted through the first trunk communication section 33b or the second trunk communication section 34b (at step S306). In the case that the control section 30b judges that the trunk frame cannot be transmitted (NO at step S306), the control section 30b returns the procedure to step S303. In the case that the control section 30b judges that the trunk frame can be transmitted (YES at step S306), the control section 30b transmits the trunk frame created by itself or the trunk frame received from any of the other relay apparatuses 3a and 3c and temporarily stored so as to be transmitted to the others (at step S307).

In the case that the control section 30b judges that no trunk frame has been received at step S304, the procedure is advanced to step S306. However, the control section 30b can simultaneously carry out transmission or reception through the first trunk communication section 33b and transmission or reception through the second trunk communication section 34b. Hence, while receiving the trunk frame through the first trunk communication section 33b, the control section 30b can transmit the trunk frame through the second trunk communication section 34b. For this reason, even in the case that the control section 30b judges that a trunk frame has been received through the first trunk communication section 33b or the second trunk communication section 34b (YES at step S304), the control section 30b advances the procedure to step S306 while the control section 30b receives and temporarily stores the trunk frame (at step S305). In the case that the first trunk communication section 33b or the second trunk communication section 34b is not used and a trunk frame to be transmitted is present, the control section 30b transmits the trunk frame (at step S307).

Next, the control section 30b judges whether all the trunk frames transmitted from the other relay apparatuses 3a and 3c and the trunk frame created by itself has been transmitted and received (at step S308). In the case that the control section 30b judges that all the trunk frames have not been transmitted and received (NO at step S308), the control section 30b returns the procedure to step S303.

In the case that the control section 30b judges that all the trunk frames have been transmitted and received (YES at step S308), the control section 30b reads the attribute values from the message groups contained in the trunk frames received and temporarily stored and the trunk frame created by itself by referring to the correspondence table 38b (at step S309). The control section 30b then renews the database 31b of the relay apparatus 3b using the read attribute values (at step S310) and completes the procedure.

FIG. 10 is an explanatory view schematically showing another example of the process in which the databases 31a, 31b and 31c of the relay apparatuses 3a, 3b and 3c according to the present embodiment are renewed by the transmission and reception of trunk frames.

The explanatory view of FIG. 10 is a block diagram showing the daisy-chain connection of the relay apparatuses 3a, 3b and 3c and the configurations of the databases 31a, 31b and 31c and the receive buffers 37a, 37b and 37c of the relay apparatuses 3a, 3b and 3c. Furthermore, the explanatory view of FIG. 10 chronologically shows how the trunk frames are transmitted and received by the control section 30a, 30b and 30c of the relay apparatuses 3a, 3b and 3c carrying out the procedure shown in the flowcharts of FIG. 9.

As shown in the flowchart of FIG. 9, the relay apparatus 3b can carry out transmission and reception simultaneously through either the first trunk communication section 33b or the second trunk communication section 34b. Hence, since the second trunk communication section 34a of the relay apparatus 3a is not used, during a period in which a trunk frame containing the attribute value group A read from the receive buffer 37a of the relay apparatus 3a is transmitted to the relay apparatus 3b via the trunk line 4, the relay apparatus 3b transmits the trunk frame containing the attribute value group B to the relay apparatus 3c while receiving the trunk frame containing the attribute value group A.

Then, in the relay apparatus 3b, while the trunk frame containing the attribute value group A received from the relay apparatus 3a is transmitted from the relay apparatus 3b to the relay apparatus 3c through the second trunk communication section 34b, the trunk frame containing the attribute value group B is transmitted to the relay apparatus 3a through the first trunk communication section 33b. Furthermore, since the first trunk communication section 33c of the relay apparatus 3c is not used, the trunk frame containing the attribute value group C is transmitted from the relay apparatus 3c to the relay apparatus 3b. At this time, since the control section 30c of the relay apparatus 3c receives the trunk frames from the other relay apparatuses 3a and 3b and transmits the trunk frame created by itself, the control section 30c reads attribute values from the message groups of all the trunk frames and renews the database 31c.

At the next timing, the relay apparatus 3b transmits the trunk frame containing the attribute value group C received from another relay apparatus 3c to the relay apparatus 3a. Then, since the control section 30b of the relay apparatus 3b has received the trunk frames from the other relay apparatuses 3a and 3c and has transmitted the trunk frame created by itself, the control section 30b reads attribute values from the message groups of all the trunk frames and renews the database 31b.

Moreover, when the control section 30a of the relay apparatus 3a has received the trunk frame containing the attribute value group C from the relay apparatus 3b, since the control section 30a has received the trunk frames from the other relay apparatuses 3b and 3c and has transmitted the trunk frame created by itself, the control section 30a reads attribute values from the message groups of all the trunk frames and renews the database 31a.

As a result, the contents of the databases 31a, 31b and 31c are synchronized so as to have the same contents. As shown in the explanatory view of FIG. 10, the amount of communication in the case that the trunk frames are transmitted and received among the relay apparatuses 3a, 3b and 3c by the time when the databases 31a, 31b and 31c are synchronized is calculated using the following expression 5.

$$\{1 \times 320 \text{ (bytes)} + H\_L + T\_L\} \quad (5)$$
$$\text{(from the relay apparatus } 3a \text{ to the relay apparatus } 3b) +$$
$$\{1 \times 320 \text{ (bytes)} + H\_L + T\_L\}$$
$$\text{(from the relay apparatus } 3b \text{ to the relay apparatus } 3c) +$$
$$\{1 \times 320 \text{ (bytes)} + H\_L + T\_L\}$$
$$\text{(from the relay apparatus } 3c \text{ to the relay apparatus } 3b) +$$
$$\{1 \times 320 \text{ (bytes)} + H\_L + T\_L\}$$
$$\text{(from the relay apparatus } 3b \text{ to the relay apparatus } 3a) =$$
$$1280 \text{ (bytes)} + 4 \times (H\_L + T\_L)$$

In the explanatory view of FIG. 10, the transmission and reception of trunk frames are carried out six times among the relay apparatuses 3a, 3b and 3c. However, each trunk frame is transmitted and received for each of the attribute value groups A, B and C. Furthermore, the transmission of the trunk frame containing the attribute value group A from the relay apparatus 3a to the relay apparatus 3b and the transmission of the trunk frame containing the attribute value group B from the relay apparatus 3b to the relay apparatus 3c are carried out simultaneously. Moreover, the transmission of the trunk frame containing the attribute value group A from the relay apparatus 3b to the relay apparatus 3c and the transmission of the trunk frame containing the attribute value group B from the relay apparatus 3b to the relay apparatus 3a are carried out simultaneously. Hence, the time required for the synchronization of the databases 31a, 31b and 31c during the period of every 1 ms is the time required for the transmission and reception of 1280 bytes of information via the trunk lines 4. Hence, the time required for the synchronization is 102 µs. As a result, the time required for the synchronization of the databases 31a, 31b and 31c is further reduced.

Although the vehicle-mounted communication system according to the present embodiment is configured such that when the control sections 30a, 30b and 30c of the relay apparatuses 3a, 3b and 3c receive the trunk frames, the control sections 30a, 30b and 30c store the correspondence tables 38a, 38b and 38c and refer to them, the configuration of the system is not limited to this configuration. For example, it may be possible to have a configuration in which the number and order of messages and the combination and order of attribute values inside the messages contained in a trunk frame transmitted and received among the relay apparatuses are predetermined for each of the relay apparatuses, and a relay apparatus having received the trunk frame specifies the relay apparatus from which the trunk frame has been transmitted and reads the attribute values accurately.

The disclosed embodiment should be construed as exemplary rather than as limitative of the present invention in all respects. The scope of the present invention is defined not by the above-mentioned descriptions but by the appended claims, and is intended to include all the modifications within the meaning and scope equivalent to the scope of the claims.

The invention claimed is:

1. A relay apparatus connected to external apparatuses for transmitting and receiving data containing numerical information and identification information of the numerical information, thereby relaying transmission and reception of data among external apparatuses, comprising:
a data receiving section that receives data from at least one of the external apparatuses;
a data storing section that stores data in a database;
a data transmitting section that transmits data read from the database to at least one of the external apparatuses;
a creating section that creates a data frame in which a plurality of pieces of numerical information on a plurality of pieces of data received from at least one of the external apparatuses are contained and a plurality of pieces of identification information corresponding to each of the plurality of pieces of the numerical information are omitted;
a data frame transmitting section that transmits the data frame created by the creating section to another relay apparatus;
a data frame receiving section that receives a data frame from another relay apparatus;
a reading section that reads, in the case that the data frame receiving section received a data frame, a plurality of pieces of numerical information contained in the received data frame; and
a renewing section that renews a plurality of pieces of numerical information on a plurality of pieces of data in the database according to the plurality of pieces of the numerical information read by the reading section.

2. The relay apparatus according to claim 1, further comprising:
an information prestoring section that prestores positions and information lengths of the numerical information contained in a data frame for each number of pieces of numerical information contained in the data frame and each data type specified depending on identification information corresponding to the numerical information, and identification information corresponding to the respective pieces of the numerical information;
an information transmitting section that transmits information on the type of data frame when the data frame is transmitted to another relay apparatus; and
a specifying section that specifies, when data frame is received from another relay apparatus, the type of the received data frame;
wherein when a data frame is received from said another relay apparatus, a plurality of pieces of numerical information are derived from the data frame on the basis of the type specified by the specifying section and the contents prestored in the information prestoring section.

3. A communication system, comprising;
a plurality of communication apparatus groups, each group being formed of a plurality of communication apparatuses for transmitting and receiving data containing numerical information and identification information of the numerical information; and
a plurality of relay apparatuses to which one or a plurality of communication apparatuses are connected in each of the plurality of communication apparatus groups, the plurality of relay apparatuses being connected mutually to relay transmission and reception of data among the communication apparatuses;
wherein each of the relay apparatuses includes:
a data receiving section that receives data from at least one of the communication apparatuses;

a data storing section that stores data in a database;

a data transmitting section that transmits data read from the database to at least one of the communication apparatuses;

a creating section that creates a data frame in which a plurality of pieces of numerical information on a plurality of pieces of data received from at least one of the communication apparatuses are contained and a plurality of pieces of identification information corresponding to each of the plurality of pieces of the numerical information is omitted;

a data frame transmitting section that transmits transmit the data frame created by the creating section to another relay apparatus;

a data frame receiving section that receives a data frame from another relay apparatus;

a reading section that reads, in the case that the data frame receiving section received data frame, a plurality of pieces of numerical information contained in the received data frame; and a renewing section that renews a plurality of pieces of numerical information on a plurality of pieces of data in the own database of each relay apparatus using the plurality of pieces of numerical information read by the reading section.

4. The communication system according to claim 3 wherein connection topology among the plurality of relay apparatuses is daisy-chain topology.

5. The communication system according to claim 3, wherein each of the relay apparatuses further includes:

an information prestoring section that prestores positions and information lengths of the numerical information contained in a data frame for each number of pieces of numerical information contained in the data frame and each data type specified depending on identification information corresponding to the numerical information, and identification information corresponding to the respective pieces of the numerical information;

an information transmitting section that transmits information on the type of data frame when the data frame is transmitted to another relay apparatus; and a specifying section that specifies, when data frame is received from another relay apparatus, the type of the received data frame;

wherein when a data frame is received from said another relay apparatus, a plurality of pieces of numerical information are derived from the data frame on the basis of the type specified by the specifying section and the contents prestored in the information prestoring section.

6. A communication method using a plurality of relay apparatuses to which one or a plurality of communication apparatuses are connected in each of a plurality of communication apparatus groups, each group being formed of the plurality of communication apparatuses for transmitting and receiving data containing numerical information and identification information of the numerical information and which are mutually connected to relay transmission and reception of data among communication apparatuses wherein each of the relay apparatuses performs:

receiving data from at least one of the communication apparatuses of the group to which the relay apparatus is connected;

storing data in a database;

transmitting data read from the database to at least one of the communication apparatuses;

creating a data frame in which a plurality of pieces of numerical information on a plurality of pieces of data received from at least one of the communication apparatuses are contained and a plurality of pieces of identification information corresponding to each of the plurality of pieces of the numerical information are omitted;

transmits the created data frame to another relay apparatus;

reading, in the case that a data frame is received from another relay apparatus, a plurality of pieces of numerical information contained in the received data frame;

renewing a plurality of pieces of numerical information on a plurality of pieces of data in the own database of each relay apparatus using the plurality of pieces of the read numerical information;

reading data from the renewed database; and transmitting the read data to at least one of the communication apparatuses of the group to which the relay apparatus is connected.

7. The communication method according to claim 6, wherein each of the relay apparatuses further performs:

prestoring positions and information lengths of the numerical information contained in a data frame for each number of pieces of numerical information contained in the data frame and each data type specified depending on identification information corresponding to the numerical information, and identification information corresponding to the respective pieces of the numerical information;

transmitting information on the type of data frame when the data frame is transmitted to another relay apparatus;

specifying, when data frame is received from another relay apparatus, the type of the received data frame; and deriving a plurality of pieces of numerical information from a data frame on the basis of the specified type and the prestored contents, when the data frame is received from said another relay apparatus.

* * * * *